(12) United States Patent
Lehner et al.

(10) Patent No.: US 6,701,889 B2
(45) Date of Patent: Mar. 9, 2004

(54) METHOD FOR DERIVING ROTOR ANGULAR ORIENTATION

(75) Inventors: Michael Lehner, Muehlacker (DE); Klaus Scherrbacher, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/297,225

(22) PCT Filed: Mar. 26, 2002

(86) PCT No.: PCT/DE02/01100

§ 371 (c)(1),
(2), (4) Date: May 15, 2003

(87) PCT Pub. No.: WO02/082630

PCT Pub. Date: Oct. 17, 2002

(65) Prior Publication Data

US 2003/0173782 A1 Sep. 18, 2003

(30) Foreign Application Priority Data

Apr. 4, 2001 (DE) .......................... 101 16 814

(51) Int. Cl.$^7$ ................................. F02P 9/00
(52) U.S. Cl. ......................... 123/334; 123/319
(58) Field of Search .................. 123/334, 335, 123/319, 406.18, 339.18

(56) References Cited

U.S. PATENT DOCUMENTS 3,900,013 A * 8/1975 Vignozzi et al. ............ 123/335
6,112,723 A 9/2000 Itoyama et al.
6,329,772 B1 * 12/2001 Ochiai ..................... 123/335

FOREIGN PATENT DOCUMENTS

| DE | 100 36 869 | 2/2002 |
| JP | 07 286 805 | 10/1995 |
| WO | WO 00 31397 | 6/2000 |

\* cited by examiner

*Primary Examiner*—Bibhu Mohanty
(74) *Attorney, Agent, or Firm*—Kenyon & Kenyon

(57) ABSTRACT

A method for determining the load angle of a three-phase current synchronous machine with the aid of position information of an internal combustion engine. The latter is furnished with an engine control device, in which operating parameters and the position information of components of the internal combustion engine are stored. The following method steps are run through: First of all, the rotational position of the internal combustion engine is recorded in the engine control device when the internal combustion engine is switched off. Before the start of the internal combustion engine, the transmission of the rotational position information of the internal combustion engine to the electrical three-phase current machine takes place for the adjustment between the rotational position information and the load angle of the electrical three-phase current machine, at a rotational speed of the internal combustion engine of n=0.

8 Claims, 2 Drawing Sheets

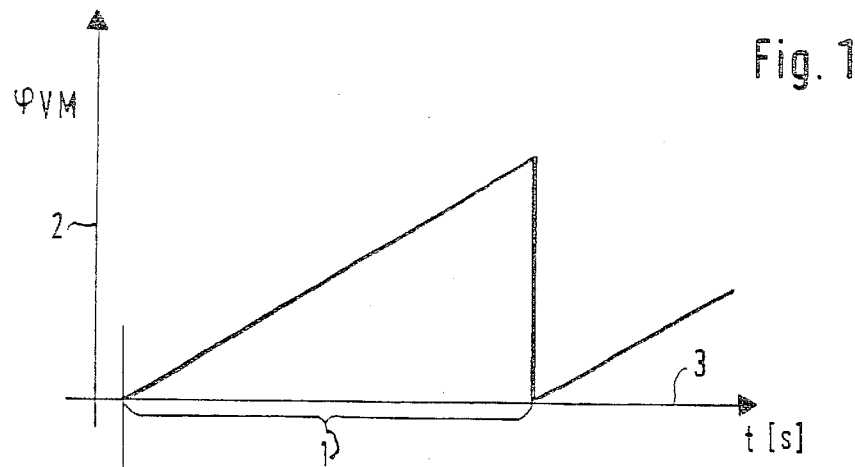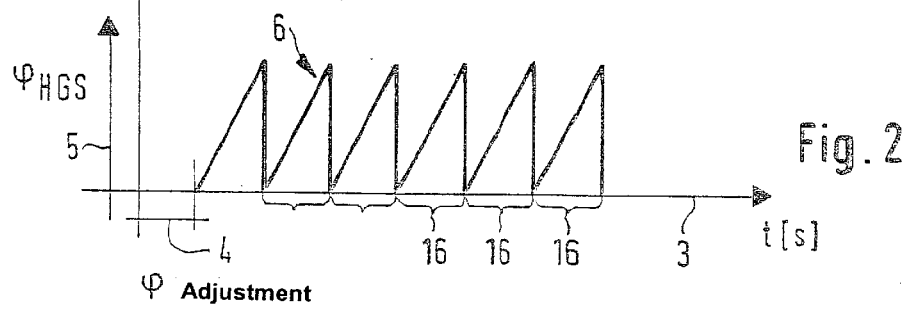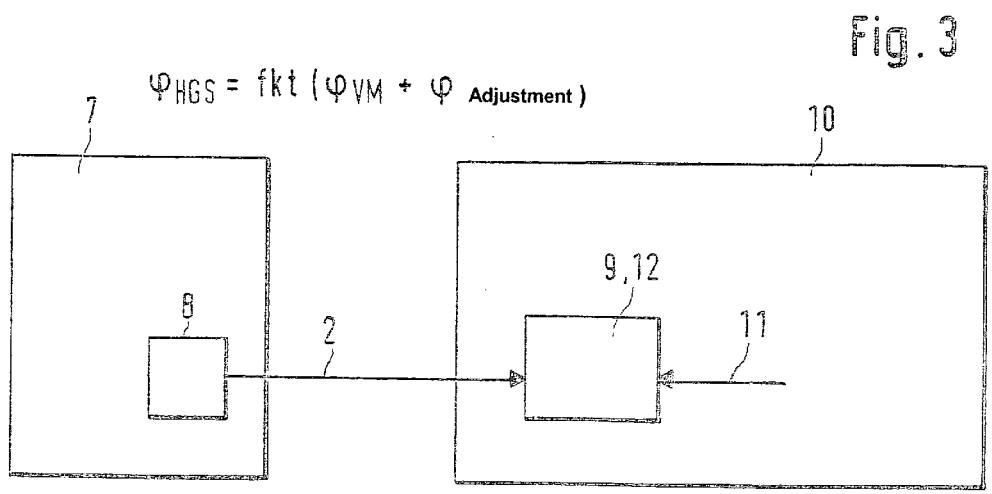

US 6,701,889 B2

METHOD FOR DERIVING ROTOR ANGULAR ORIENTATION

BACKGROUND INFORMATION

Machine regulation of a high-output generator having the starting function of a three-phase current synchronous machine requires information on the load angle (pole wheel position angle). If incremental encoders are used, recording the load angle is possible only in moved/rotating systems. However, to make available maximum torque, for example at the starting of the internal combustion engine, information on the pole wheel position is already required at a rotational speed n=0.

A system for reducing torsional vibrations in the power train may be seen in the journal "System Partner 98", pages 64 to 66. The system combines two electrical machines in itself, which are used on the one hand for the "start" function, and on the other hand for voltage supply in the vehicle electrical system of motor vehicles. Using the proposed design approach, the power of the electrical machine may be used to apply torque impulses to the crankshaft of the internal combustion engine, so that noticeable rotational irregularities may be minimized.

The electrical machine used generates a great acceleration of the crank mechanism, the internal combustion engine being accelerated to idling speed; only after that, does ignition take place. The generator function of the system offers high electrical power even at very low rotational speeds; the three-phase machine is driven from a pulse-controlled inverter, and therefore, with respect to its rotational speed and its torque, it is able to be freely controlled and regulated.

A method for estimating the pole wheel position in a claw pole machine may be seen in German Patent Application No. DE 100 36 869. This relates to a method for determining the position of a rotating component of a claw pole machine which is operated in the RST system, and for whose regulation the transformation of the stator variables from the RST system into the d, q system and vice versa is required. The claw pole machine as an overall system is subdivided into a non-observable subsystem and an observable subsystem containing a filter element. The filter element contained in the observable subsystem delivers the output variables.

The method permits the determination of the pole wheel position only when the internal combustion engine is rotating, so that the search cycle prolongs the starting process inadmissibly when a high-output generator is used, and again partially reduces to nothing the driving advantage achievable by the use of these high-output machines.

SUMMARY OF THE INVENTION

Using the method according to the present invention, in the ideal case the search cycle may be completely eliminated by evaluating data that are already available in the engine control unit. On account of the utmost stable, known coupling of the crank mechanism and the electrical machines by a belt drive, the pole wheel position and the rotational position of the crankshaft of the internal combustion engine are in a fixed, known ratio to each other.

When the internal combustion engine is turned off, the rotational position of the internal combustion engine can be recorded in the engine control unit and stored permanently.

The storage of the last instantaneous rotational position information may be written into a memory which retains this information even if current supply of the engine control unit is interrupted. During the next starting procedure of the internal combustion engine there is thus available an exact value for the crankshaft's angular position of the internal combustion engine, so that the starting phase of an internal combustion engine may be drastically shortened by the omission of the search cycle.

Compared to design approaches used up to the present in the related art, by reverting to rotational position information gathered at the time of the previous shutting down of the internal combustion engine, the search cycle preceding the starting procedure is either made completely superfluous, so that the internal combustion engine may be started directly at the required torque, or the initial value for beginning the search cycle may be selected so that the search cycle is drastically shortened from a time point of view, and can be held small with respect to the angle swept over.

Thereby, an absolute angle encoder may be saved in the electrical polyphase machine, such as a high-output generator, which is to be synchronized with respect to the pole wheel position. Internal combustion engine and electrical three-phase machine are in a fixedly predefined coupling connection to each other, e.g. via a belt drive, which is held at the appropriate initial tension to exclude slippage. If the internal combustion engine is switched off, then, via the transmission ratio of the belt drive, the belt length, the diameter of the belt pulley of the electrical poly-phase machine as well as of the diameter of the belt pulley mounted laterally on the crankshaft, the pole wheel position is coupled to the position of the belt pulley on the crankshaft side. From this, the pole wheel position is able to be adjusted to the rotational position of the internal combustion engine in one balancing operation; since this operation takes place at a rotational speed n=0, the influences of the coupling—in the case of the belt drive selected here the appearance of slippage—is suppressed.

BRIEF DESCRIPTION OF THE DRAWINGS

FIG. 1 shows the rotational position pattern of the crankshaft of an internal combustion engine, plotted against time.

FIG. 2 shows the rotational position pattern of the pole wheel of a high-output generator, plotted against time.

FIG. 3 shows the adjustment between the engine control unit of the internal combustion engine and the electrical machine.

DETAILED DESCRIPTION

Figure 4:
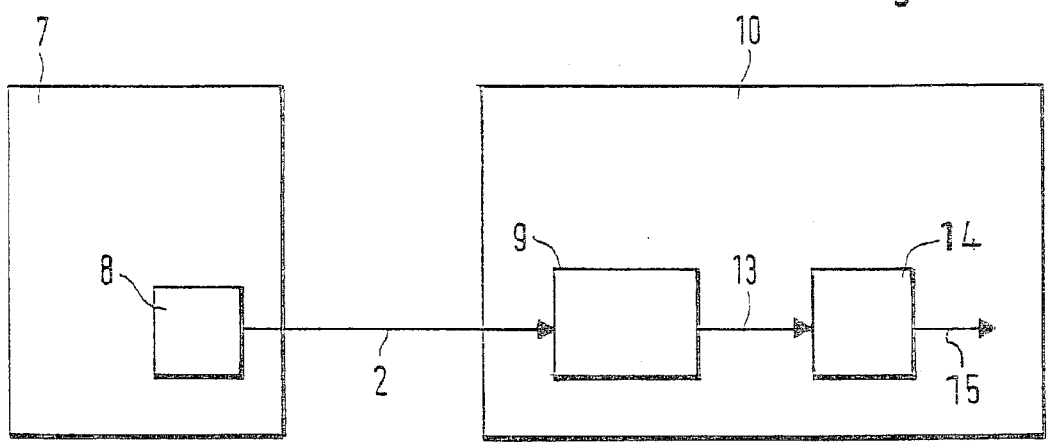
FIG. 4 shows the derivation of the load angle from the rotational position information of the internal combustion engine for the activation of a search cycle, if required.

FIG. 1 shows the rotational position pattern of the crankshaft of an internal combustion engine, plotted along the time axis.

In FIG. 1, the characteristic pattern of crankshaft angle 2 for one crankshaft rotation is reproduced. The sawtooth-shaped pattern that comes about for a crankshaft angle 1 ($T_{KW}$) represents a complete crankshaft angle rotation from 0° to 360°. This pattern sets in periodically, the times required for a complete rotation of the crankshaft decreasing continuously with growing rotational speed of the internal combustion engine.

In the representation in FIG. 2 there may be seen the rotational position pattern of the pole wheel of an electrical three-phase current machine, such as a high-output generator, likewise plotted along time axis 3.

In dependence on the coupling of electrical three-phase current machine 10 with the internal combustion engine, an extremely firm connection occurs between a complete revolution of the pole wheel of the electrical three-phase current machine and the crankshaft. In the example shown in FIG. 2, the pole wheel of the electrical three-phase machine rotates six times for one complete revolution of the internal combustion engine's crankshaft. The respective complete revolution of the pole wheel of the three-phase machine is shown having reference numeral 16. A comparison of the angle position pattern according to FIG. 1 and FIG. 2 shows that sawtooth profile 6 is offset by a temporal shift which corresponds to angle adjustment region 4.

In an engine control device associated with the internal combustion engine, the relationship between rotational angle 2 of the internal combustion engine and rotational angle 5 of the electrical three-phase machine may be stored as a characteristic line field relationship as a function of the belt length, a function of the diameters of the belt pulleys and, in the normal case, the tension prevailing in the belt drive.

FIG. 3 shows the adjustment between the engine control device of the internal combustion engine and the electrical machine, with respect to the rotational position information.

An engine control device 7, which is associated with the internal combustion engine, records its operating parameters. In addition to that, at engine control device 7 shown schematically here, memory locations are provided in which characteristic line relationships, such as the above-mentioned characteristic line relationship for the belt drive of the electrical three-phase machine, are stored. When the internal combustion engine is switched off, the position of the crank mechanism, i.e. the crankshaft, is ascertained by engine control device 7 and permanently stored in it. The storing preferably takes place in that, even when the current supply to engine control device 7 is interrupted, that is, when the internal combustion engine is switched off, the last instantaneous position of the cranking mechanism is stored. This rotational position information 2 is made available for information when the internal combustion engine is started again by electrical three-phase machine 10, e.g. a high-output generator. For this purpose, a position sensor 8 inside engine control device 7 transmits rotational position 2 to a synchronization step 9 of electrical three-phase machine 10, in which an adjustment is able to be made of rotational information 2 of the internal combustion machine, of the angle position of the crank mechanism and, as a further input value, of load angle 11. Because of the coupling of the internal combustion engine and the electrical three-phase current machine via, for instance, a belt drive, pole wheel position 5 as well as rotational position 2 of the internal combustion engine are predefined in a defined relationship to each other, so that, within the framework of the synchronization step, an adjustment is able to be made of pole wheel position 5 $\psi_{HGS}$ as a function of rotational position information 2 ($\psi_{VM}$) and the adjustment angle ($\psi_{adjustment}$). Given sufficient accuracy of rotational position information 2 of the crank mechanism transmitted by engine control unit 7 of the internal combustion engine coupled with electrical three-phase current machine 10, search cycle 14 (cf representation as in FIG. 4) may be omitted.

The adjustment taking place in synchronization step 9 between rotational position information 2($\psi_{VM}$) and load angle 5($\psi_{HGS}$) takes place at a rotational speed of the internal combustion engine=0, so that the influences of the coupling of the internal combustion engine and associated electrical three-phase current machine 10 may, to the greatest extent, be ignored. Such an influence making the adjustment difficult would be, for example, an occurring slippage between the belt pulley at the crankshaft of the internal combustion engine and the belt pulley driving electrical three-phase current machine 10. However, since the adjustment procedure is omitted at rotational speed n=0, when slippage occurs in the belt drive, the relationship between rotational position information 2 of the internal combustion engine and the pole wheel position of the three-phase current machine is not invalidated.

From the representation as in FIG. 4, the derivation of the load angle from the rotational position information of the internal combustion engine to the possibly required execution of a search cycle may be seen.

Analogously to the representation in FIG. 3, engine control unit 7 transmits, via position sensor 8 integrated into it, rotational position information 2, i.e. the crankshaft angle of the internal combustion engine, to electrical three-phase current machine 10, for instance, a high-output generator. Rotational position information 2 ($\psi_{VM}$) is used as the input variable for a synchronization step 9, which is provided in three-phase current machine 10. In synchronization step 9, an initial value 13 is ascertained for a search cycle 14. As a function of the transmitted values of rotational position information 2 of the internal combustion engine by position sensor 8 of engine control unit 7, initial value 13 for search cycle 14 to be carried out can be selected in such a way that search cycle 14 may be kept short or small, respectively, with respect to time and the angular region swept over. Using the input information of rotational position 2 of the crank mechanism of the internal combustion engine, search cycle 14 is able to be clearly shortened, or to be completely omitted in the ideal case (cf the representation as in FIG. 3).

If rotational position information 2 of the internal combustion engine is ascertained using absolute angle sensors in the internal combustion engine, the adjustment in synchronization step 9 may be optimized in an advantageous manner. In addition, absolute angle encoders, which would otherwise have to be provided in electrical three-phase current machine 10, may be saved.

As a result, with the aid of initial value 13, predefined by synchronization step 9 and in dependence on its rotational position information 2 of the internal combustion engine, a load angle information 15 is generated, which the electrical three-phase current machine 10 should assume to generate the greatest torque required for starting and to shorten the starting procedure.

Using the method according to the present invention, which is carried out when the rotational speed of the internal combustion engine n=0, the duration of search cycle 14 may be considerably restricted, since it is limited to a window which is limited by position sensor 8 via engine control unit 7. An inadmissible prolonging of the starting procedure of an internal combustion engine by an electrical three-phase current machine 10, such as a high-output generator, may now be omitted in the ideal case by using the method according to the present invention (cf representation as in FIG. 3).

On the other hand, if a search cycle 14 is required, this can be limited temporally and with respect to the search window in such a way that the occurrence of unwanted events, during the revolution of the crank mechanism of the internal combustion engine during search cycle 14, may to the greatest extent be excluded.

Reference Numeral List

1 $t_{KW}$=crankshaft revolution
2 rotational position information, internal combustion engine
3 time axis
4 angle adjustment region
5 load angle
6 sawtooth profile
7 engine control unit
8 position sensor
9 synchronization step
10 electrical three-phase current machine
11 input value load angle
12 adjustment
13 initial value
14 search cycle
15 load angle output value
16 revolution, electrical machine

What is claimed is:

1. A method for determining a load angle of a three-phase current synchronous machine with the aid of position information of an internal combustion engine, which is furnished with an engine control device in which operating parameters and the position information of components of the engine are stored, the method comprising:
   recording a rotational position of the engine in the engine control device when the engine is switched off; and
   transmitting rotational position information of the engine to the three-phase current synchronous machine for adjustment between the rotational position information and a position angle of the three-phase current synchronous machine at a rotational speed of the engine of n=0.

2. The method according to claim 1, wherein the machine and the engine are coupled with each other.

3. The method according to claim 1, further comprising performing a rotational position determination of the machine before a starting procedure within the framework of a search cycle.

4. The method according to claim 3, wherein the search cycle is considerably minimized by the transmission of the rotational position information of the engine by the engine control device to the machine.

5. The method according to claim 3, further comprising selecting an initial value for the search cycle, by a stipulation of the rotational position information, such that the search cycle is held short with respect to time and, more so, small by an angular region swept over.

6. The method according to claim 1, wherein a start of the engine takes place directly because of a stipulation of the rotational position information of the engine by the engine control device.

7. The method according to claim 1, further comprising ascertaining the rotational position information of the engine using absolute angle sensors, when the engine is switched off.

8. The method according to claim 1, further comprising, when the engine is switched off, maintaining and accessing, when the engine is started again, information corresponding to the rotational position of the engine.

* * * * *